United States Patent [19]

Osment et al.

[11] Patent Number: 5,019,431

[45] Date of Patent: May 28, 1991

[54] METHOD OF MAKING ARTIFICIAL FOLIAGE

[75] Inventors: David L. Osment; Dwayne Fulton, both of Osage Beach, Mo.

[73] Assignee: Osment Models, Inc., Linn Creek, Mo.

[21] Appl. No.: 425,057

[22] Filed: Oct. 20, 1989

[51] Int. Cl.[5] .......................... B32B 27/40; B44F 7/00

[52] U.S. Cl. .......................................... 428/15; 156/61; 428/17

[58] Field of Search ....................... 428/15, 17, 20, 18, 428/19, 919; 156/61

[56] References Cited

U.S. PATENT DOCUMENTS

| | | | |
|---|---|---|---|
| 1,949,063 | 2/1934 | Merrill | 428/17 X |
| 2,811,906 | 11/1957 | Chappell | 428/48 X |
| 2,977,864 | 4/1961 | Pullar | 428/403 X |
| 2,978,351 | 4/1961 | Pullar | 428/403 |
| 3,554,848 | 1/1971 | Dock | 428/15 |
| 4,082,586 | 4/1978 | Osment | 428/18 X |
| 4,202,922 | 5/1980 | Osment | 428/18 |
| 4,278,481 | 7/1981 | Osment | 428/18 X |

*Primary Examiner*—Henry F. Epstein
*Attorney, Agent, or Firm*—Kokjer, Kircher, Bradley, Wharton, Bowman & Johnson

[57] ABSTRACT

A simulated vegetation product and method of making same is the subject of this disclosure. The method includes the steps of providing a mass of ground rubber-like particles, preferably urethane foam, providing a quantity of an adhesive solution capable of binding the ground particles together followed by mixing of the adhesive and the ground particles to present a homogeneous mass. The mass is then spread into a uniform layer or formed into another desired shape and dried to present the finished product.

7 Claims, No Drawings

METHOD OF MAKING ARTIFICIAL FOLIAGE

This invention relates generally to the construction of man made replications of natural landscapes and, more particularly, to a method of preparing simulated vegetation and to the simulated vegetation product.

BACKGROUND OF THE INVENTION

Model trees, bushes, grass and other vegetation are utilized in various man made replications of natural landscapes. They are widely used for architectural models, battle field scenes, and model railroad installations. A method of constructing simulated vegetation and a simulated vegetation product are shown and described in U.S. Pat. Nos. 4,202,922 and 4,278,481 issued to one of the present co-inventors. The referenced patents disclose a simulated vegetation prOduct wherein a non-ferrous light-penetrable fibrous material is employed as a substrate and is coated with a spray adhesive for holding a rubber-like foam material such as shredded latex which has been dyed to a natural vegetation color.

It has heretofore been thought that in order to utilize ground foam particles and the like for use in simulating vegetation, it is necessary to attach the foam by way of an adhesive to the substrate. There has not been any known method of holding the foam together without utilization of a substrate. One of the primary reasons for always utilizing a substrate with the ground foam-like particles is the belief that to try and hold the particles together without a substrate would require a large amount of adhesive which would tend to form uneven "lumps" or clusters that would not result in a desirable product.

SUMMARY OF THE INVENTION

The present invention provides a method for preparing simulated vegetation utilizing ground foam particles without the need for attaching the particles to a substrate and also encompasses the artificial vegetation product formed according to the method. The method provides for holding the particles together in a loosely bound homogeneous mass by mixing the ground foam with a dilute adhesive which will bind the particles. The adhesive coated particles are formed into a desired configuration such as a single homogeneous layer before the adhesive dries so as to present the finished product.

It is therefore an object of the present invention to provide a simulated vegetation article and method of producing same which does not require utilization of a substrate but instead is formed in a unitary homogeneous mass of material.

Still another objective of this invention is to provide an artificial vegetation product and method of making same which does not employ any substrate but is a unitary homogeneous mass of material and is capable of being formed into a variety of shapes useful in simulating natural vegetation, especially bushes and other low height plants.

Still another objective of our invention is to provide an artificial vegetation product and method of making same which does not employ any substrate but may be formed into a unitary homogeneous layer.

Another very important objective of this invention is to provide an artificial vegetation product which is homogeneous and may be used in varying sizes and thicknesses to simulate light or heavy vegetation.

It is also an important objective of this invention to provide an artificial vegetation product which is homogeneous in nature and is capable of being molded and shaped into any desired configuration.

It is also one of the aims of our invention to provide an artificial vegetation product which does not require any substrate but is a unitary homogenous mass that is capable of being made to look like various types of vegetation including ground cover, bushes and tree foliage.

Other objects of the invention will be made clear or become apparent from the following description and claims.

The starting material for the simulated vegetation product according to the invention is a rubber-like foam material such as shredded latex or urethane foam which is capable of being dyed to a desired color. The preferred material is a flexible polyurethane foam. The foam is mixed with a liquid colorant (pigment in water) and then ground in a grinder. Preferably, a water base pigment is utilized during the grinding step to impart the desired color to the foam. A quantity of approximately one gallon of dye will color 12 gallons of ground foam. The wet foam is ground to an approximate size which will pass a #3 U.S.T.M. screen mesh size but will not pass a #100 U.S.T.M. screen mesh size. The ground foam is then dried in a commercial type dryer at temperature of between 150° and 200° F. for about 1 hour. After drying, the foam material is sifted to a size which will pass a #8 U.S.T.M. screen mesh size but will not pass a #24 U.S.T.M. screen mesh size. The screen size will vary depending on the application.

Next, the dry ground foam is mixed with a suitable adhesive. Virtually any type of adhesive can be employed. Various types of adhesives which can be utilized in the method of the invention include acrylics, vinyl acrylics, styrene acrylic co-polymer, urethane and latex foam adhesives, alcohol based cements, and virtually any other commercially available adhesive products. It is preferable to employ adhesives that are water soluble and avoid organic solvents. The preferred adhesive is an acrylic polymer aqueous emulsion having a boiling point of 212° F., a melting point of 32° F., a specified gravity of between 1 to 1.2 and a vapor pressure of 17mm Hg at 68° F. A product meeting these specifications is sold under the trademark RHOPLEX B15J by the Rohn & Haas Company of Philadelphia, Pa. The preferred adhesive is diluted with 15–35% by volume of water (preferably 25%) and is added to the ground dry foam particles at the rate of 8 to 16 ounces per gallon of foam. The blend of adhesive and foam is mixed in a commercial mixer until all of the foam particles have been evenly covered with the liquid solution.

The coated foam particles having been thoroughly mixed with the adhesive solution to present a homogeneous mass of material are dumped onto a drying tray. The thickness will vary depending on the use of the finished product. The foam and adhesive mix can also be dumped in a mold depending on the shape desired for the dried product. Two of the most useful configurations are a homogeneous irregular sphere and a uniform homogeneous layer. The material is then dried for between 2 and 8 hours at a temperature in the range of 100° to 500° F. to remove the water or other solvent components of the solution. Manifestly, the drying time will vary depending upon the temperature and thickness of the material. The particular solvent used for the adhesive will also greatly affect the drying time with water based adhesives requiring somewhat longer drying.

Once the material is completely dried, it may be cut and packaged into smaller sizes if desired. The final product is a useful article for simulating vegetation in man made replications of natural landscapes which comprises a unitary mass of finely ground rubber-like particles that are intricately joined together by an adhesive that is evenly distributed to present a homogeneous mass which can be formed into any desired shape to simulate natural vegetation.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, we claim:

1. A method of preparing substrate-free simulated vegetation for use in man made replications of natural landscapes, said method comprising:

providing a mass of finely ground foamed particles;

providing a quantity of an adhesive solution characterized by the ability to bind said ground particles together;

mixing said adhesive solution and said ground particles together to thoroughly coat the latter with the former thereby forming a homogeneous mass;

placing said homogeneous mass onto a substrate;

drying said homogeneous mass to remove the adhesive solvent components of said solution; and removing said dried homogeneous mass from said substrate.

2. A method as set forth in claim 1, wherein said drying step comprising drying at 100–500° F. for up to 8 hours.

3. A method as set forth in claim 2, wherein said adhesive is characterized by the ability to be diluted with a solvent, and said step of providing an adhesive comprises providing a diluted solution of said adhesive.

4. A method as set forth in claim 3, wherein said particles are characterized by a size large enough to pass over a #24 mesh screen and small enough to pass through a #8 mesh screen.

5. A method as set forth in claim 3, wherein said particles are urethane foam.

6. A method as set forth in claim 5, wherein said adhesive comprises a water emulsion of an acrylic polymer.

7. An artificial product for simulating vegetation in a man made replication of a natural landscape and made according to the method of any one of claims 1 or 2–6.

* * * * *